United States Patent [19]

Takahashi et al.

[11] Patent Number: 4,926,047
[45] Date of Patent: May 15, 1990

[54] RADIATION IMAGE RECORDING AND REPRODUCING METHOD AND RADIATION IMAGE STORAGE PANEL EMPLOYED FOR THE SAME

[75] Inventors: Kenji Takahashi; Takashi Nakamura, both of Kaisei, Japan

[73] Assignee: Fuji Photo Film Co., Ltd., Kaisei, Japan

[21] Appl. No.: 110,025

[22] Filed: Oct. 15, 1987

Related U.S. Application Data

[63] Continuation of Ser. No. 857,512, Apr. 21, 1986, and a continuation of Ser. No. 543,326, Oct. 19, 1983.

[30] Foreign Application Priority Data

Oct. 22, 1982 [JP] Japan .................. 57-184455

[51] Int. Cl.$^5$ .................. G01T 1/202; C09K 11/46
[52] U.S. Cl. .................. 250/484.1; 252/301.4 H
[58] Field of Search .................. 250/327.2, 484.1; 252/301 H

[56] References Cited

U.S. PATENT DOCUMENTS 4,236,078 11/1980 Kotera et al. .................. 250/327.2
4,261,854 4/1981 Kotera et al. .................. 250/327.2

FOREIGN PATENT DOCUMENTS 0029963 11/1979 European Pat. Off. ......... 250/327.2
0019880 12/1980 European Pat. Off. ......... 252/301.4 H

*Primary Examiner*—Janice A. Howell
*Assistant Examiner*—Richard Hanig
*Attorney, Agent, or Firm*—Sixbey, Friedman, Leedom & Ferguson

[57] ABSTRACT

A radiation image recording and reproducing method comprising steps of:

causing a stimulable phosphor to absorb a radiation having passed through an object or radiated by an object, exposing said stimulable phosphor to an electromagnetic wave having a wavelength within the range of 450–800 nm to release the radiation energy stored therein as light emission, and detecting the emitted light, in which said stimulable phosphor is a divalent europium activated complex halide phosphor having the formula (I):

$$M^{II}FX \cdot aM^{I}X' \cdot bM'^{II}X''_2 \cdot cM^{III}X'''_3 \cdot xA{:}yEu^{2+} \qquad (I)$$

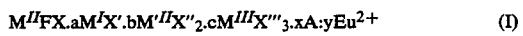

in which $M^{II}$ is at least one alkaline earth metal selected from the group consisting of Ba, Sr and Ca; $M^{I}$ is a least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X" and X"' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satifying the conditions of $0 < x \leq 0.5$ and $0 < y \leq 0.2$, respectively. A radiation image storage panel employed for the method is also disclosed.

12 Claims, 1 Drawing Sheet

RADIATION IMAGE RECORDING AND REPRODUCING METHOD AND RADIATION IMAGE STORAGE PANEL EMPLOYED FOR THE SAME

This application is a continuation of Ser. No. 857,512, filed Apr. 21, 1986, now abandoned, and a continuation of Ser. No. 543,326, filed Oct. 19, 1983, now abandoned.

BACKGROUND OF THE INVENTION

1. Field of the Invention

The present invention relates to a radiation image recording and reproducing method and a radiation image storage panel employed for the same, and more particularly, to a radiation image recording and reproducing method utilizing a divalent emporium activated complex halide stimulable phosphor and a radiation image storage panel employed for the same.

2. Description of Prior Art

For obtaining a radiation image, there has been conventionally employed a radiography utilizing a combination of a radiographic film having an emulsion layer containing a sensitive silver salt material and an intensifying screen. As a method replacing the above-mentioned conventional radiography, a radiation image recording and reproducing method utilizing a stimulable phosphor as described, for instance, in U.S. Pat. No. 4,239,968, has been recently paid much attention. The radiation image recording and reproducing method involves steps of causing the stimulable phosphor to absorb a radiation having passed through an object or having radiated by an object; exciting the phosphor with an electromagnetic wave such as visible light or infrared rays (stimulating rays) to release the radiation energy stored in the phosphor as light emission (stimulated emission); photo-electrically converting the emitted light to electric signals; and reproducing the electric signals as a visible image on a recording material such as a radiographic film or on a recording apparatus such as CRT.

Examples of the stimulable phosphor employed in the above-described radiation image recording and reproducing method, for instance, include a cerium and samarium activated strontium sulfide phosphor (SrS:Ce,Sm), an europium and samarium activated strontium sulfide phosphor (SrS:Eu,Sm), an erbium activated thorium dioxide phosphor (ThO$_2$:Er), and an europium and samarium activated lanthanum oxisulfide phosphor (La$_2$O$_2$S Eu,Sm), as disclosed in U.S. Pat. No. 3,859,527. Further, the above-mentioned U.S. Pat. No. 4,239,968 discloses an alkaline earth metal fluorohalide phosphor having the formula (Ba$_{1-x}$,M$^{2+}$$_x$)FX:yA, in which M$^{2+}$ is at least one divalent metal selected from the group consisting of Mg, Ca, Sr, Zn and Cd; X is at least one halogen selected from the group consisting of Cl, Br and I; A is at least one element selected from the group consisting of Eu, Tb, Ce, Tm, Dy, Pr, Ho, Nd, Yb and Er; and x and y are numbers satisfying the conditions of $0 \leq x \leq =0.6$ and $0 \leq y \leq 0.2$, respectively.

In the above-described radiation image recording and reproducing method, a radiation image can be obtained with a sufficient amount of information by applying a radiation to the object at a considerably smaller dose, as compared with the conventional radiography. Accordingly, the radiation image recording and reproducing method is of great value, especially when the method is used for medical diagnosis.

The radiation image recording and reproducing method, as described above, is very useful for obtaining a radiation image as a visible image. However, it is desired that the sensitivity to a radiation of the method is further enhanced to decrease the exposure dose for a human body and facilitate the procedure for converting the stimulated emission to electric signals. Especially when the radiation is applied to a human body, the enhancement in the sensitivity to a radiation is of much value from the viewpoint of adverse effect of the radiation on the human body, even if the level of the enhancement is not so remarkable.

SUMMARY OF THE INVENTION

A principal object of the present invention is to provide a radiation image recording and reproducing method improved in the sensitivity.

The object is accomplished by the radiation image recording and reproducing method of the present invention comprising steps of:

causing a specific divalent europium activated complex halide phosphor to absorb a radiation having passed through an object or radiated by an object, exposing said phosphor to an electromagnetic wave having a wavelength within the range of 450–800 nm to release the radiation energy stored therein as light emission, and detecting the emitted light.

The divalent europium activated complex halide phosphor employed in the present invention has the formula (I):

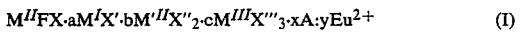

$$M^{II}FX \cdot aM^{I}X' \cdot bM'^{II}X''_2 \cdot cM^{III}X'''_3 \cdot xA:yEu^{2+} \qquad (I)$$

in which M$^{II}$ is at least one alkaline earth metal selected from the group consisting of Ba, Sr and Ca; M$^{I}$ is at least one alkali metal selected from the group consisting of Li, Na, K, Rb and Cs; M'$^{II}$ is at least one divalent metal selected from the group consisting of Be and Mg: M$^{III}$ is at least one trivalent metal selected from the group consisting of Al, Ga, In and Tl; A is at least one metal oxide; X is at least one halogen selected from the group consisting of Cl, Br and I; each of X', X''and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and X and y are numbers satisfying the conditions of $0 < x \leq 0.5$ and $0 < y \leq 0.2$, respectively.

According to the study of the inventors, it has been discovered that the divalent europium activated complex halide phosphor having the above-mentioned formula (I) shows light emission of high luminance when excited with an electromagnetic wave having a wavelength within the range of 450–800 nm after exposure to a radiation such as X-rays, and that the radiation image recording and reproducing method has higher sensitivity than the known ones have.

In the radiation image recording and reproducing method of the present invention, the above-mentioned phosphor having the formula (I) is preferably employed in the form of a radiation image storage panel containing thereof (also called a stimulable phosphor sheet).

A radiation image storage panel has a basic structure comprising a support and a phosphor layer provided on one surface of the support. Further, a transparent protective film is generally provided on the free surface of the phosphor layer (surface not facing the support) to keep the phosphor layer from chemical deterioration or physical shock.

Accordingly, the radiation image recording and reproducing method of the invention is preferably carried out by employing a radiation image storage panel of the invention comprising a support and at least one phosphor layer which comprises a binder and a stimulable phosphor dispersed therein, in which at least one phosphor layer contains the divalent europium activated complex halide phosphor having the above-described formula (I).

Figure 1:
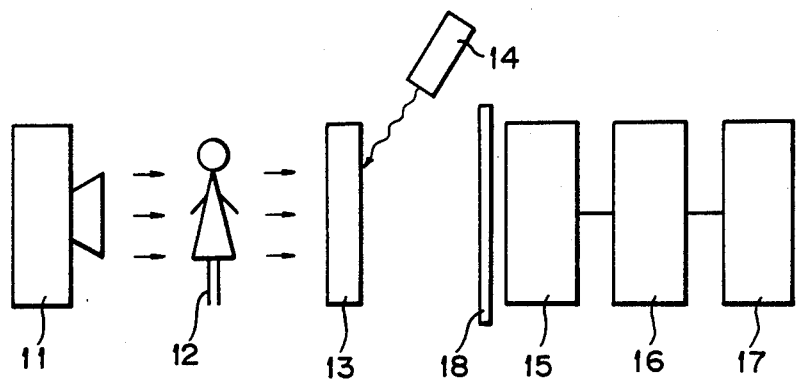
FIG. 1 is a schematic view showing the radiation image recording and reproducing method in accordance with the present invention, in which the numbers are used to designate the followings.

11: radiation generating device, 12: object, 13: panel, 14: source of stimulating rays, 15: photosensor, 16: image reproducing device, 17 display device, 18: filter.

DETAILED DESCRIPTION OF THE INVENTION

The present invention provides the prominent enhancement in the sensitivity of the radiation image recording and reproducing method by employing the above-described divalent europium activated complex halide phosphor having the formula (I) as a stimulable phosphor used therein.

The radiation image recording and reproducing method having the high sensitivity as mentioned above is now described more in detail with respect to an example in which the stimulable phosphor having the formula (I) is employed in the form of a radiation image storage panel containing thereof, by referring to a schematic view shown in FIG. 1.

In FIG. 1 which shows the total system of the radiation image recording and reproducing method of the present invention, a radiation generating device 11 such as an X-ray source emits a radiation for irradiating an object 12 with the radiation; a radiation image storage panel 13 containing the stimulable phosphor having the above-described formula (I) absorbs and stores energy of the radiation having passed through the object 12; a source of stimulating rays 14 emits an electromagnetic wave (stimulating rays) for impinging upon the panel 13 to release the radiation energy stored in the panel 13 as light emission; a photosensor 15 such as a photomultiplier faces the panel 13 for detecting the light emitted from the panel 13 and converting it to electric signals; an image reproducing device 16 is connected with the photosensor 15 to reproduce a transmitted radiation image from the electric signals obtained by the photosensor 15; a display device 17 is connected with the reproducing device 16 to display the reproduced image in the form of a visible image on a CRT or the like; and a filter 1B is disposed in front of the photosensor to cut the stimulating rays reflected by the panel 13 and allow only the light emitted by the panel 13 to pass through.

FIG. 1 illustrates an example of the system according to the method of the invention employed for obtaining a transmitted radiation image of an object. In the case that the object 12 itself emits a radiation, it is unnecessary to provide the above-mentioned radiation generating device 11 in the system. Further, the devices 15 through 17 in the system can be replaced with other appropriate devices which can reproduce a transmitted radiation image having the information of the object 12 from the light emitted by the panel 13.

Referring to FIG. 1, when the object 12 is exposed to a radiation such as X-rays emitted by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13 in proportion to the intensity of the radiation. Thus, a radiation energy-stored image (a kind of latent image) corresponding to the transmitted radiation image of the object 12 is formed on the panel 13.

Then, when the radiation image storage panel 13 is exposed to an electromagnetic wave having a wavelength within the range of 450–800 nm, emitted from the source of stimulating rays 14, the radiation energy-stored image formed on the panel 1S is released as light emission. The luminance of so released light is in proportion to the intensity of the radiation energy which has been absorbed by the phosphor layer of the panel 13. The light signals having the luminance of the emitted light are converted to electric signals by means of the photosensor 15. The electric signals are reproduced as an image by the image reproducing device 16, and the reproduced image is displayed on the display device 17. In the concrete, the detection of the radiation image stored in the panel 13 can be, for instance, carried out by scanning the panel 13 with the electromagnetic wave emitted from the source of stimulating rays 14 and detecting the light emitted from the panel 13 under scanning by means of the photosensor 15 to sequentially obtain the electric signals.

In the radiation image recording and reproducing method of the present invention, there is no specific limitation on the radiation employable for exposure of an object so as to obtain a transmitted radiation image thereof, as far as the above-described phosphor shows stimulated emission upon excitation with the above-mentioned electromagnetic wave after exposure to the radiation. Examples of the radiation employable in the invention include those generally known such as X-rays, cathode rays and ultraviolet rays. Likewise, there is no specific limitation on the radiation emitted by an object for obtaining a radiation image thereof, as far as the radiation is absorbed by the above-described phosphor in the from of an energy source for producing the stimulated emission. Examples of the radiation include $\gamma$ rays, $\alpha$ rays and $\beta$ rays.

As the source of stimulating rays for exciting the phosphor which has absorbed the radiation having passed through or emitted by the object, there can be employed light sources emitting the light having the band spectrum distribution in the wavelength region of 450–800 nm; and light sources emitting the light having a wavelength such as an $Ar^+$ ion laser (457.9 nm, 488.0 nm, 54.5 nm, etc.), a He-Ne laser (632.8 nm) and a ruby laser (694 nm). Among the above-mentioned sources of stimulating rays, the lasers are preferred because the radiation image storage panel can be exposed thereto with a high energy density per unit area. Particularly preferred are an $Ar^+$ ion laser and a He-Ne laser.

The radiation image storage panel employable in the radiation image recording and reproducing method of the invention will be described hereinafter.

The radiation image storage panel, as described hereinbefore, comprises a support and at least one phosphor layer provided thereon comprising a binder and the divalent europium activated complex halide phosphor having the above-mentioned formula (I) dispersed therein.

The radiation image storage panel having the above-described structure can be prepared, for instance, in the manner described below.

In the first place, the divalent europium activated complex halide phosphor having the formula (I) will be described.

From the viewpoint of enhancement in the luminance of stimulated emission of the phosphor, each of $X'$, $X''$ and $X'''$ in the formula (I) are preferably Br or I, and particularly preferred is Br. $M^I$ is preferably Li or Na, and particularly preferred is Na. As for $M'^{II}$, there is no specific preference between Be and Mg, and both can give almost the same results. $M^{III}$ is preferably Al or Ga. The preferred numbers for a indicating the content of $M^I X'$, b indicating the content of $M'^{II} X''_2$ and c indicating the content of $M^{III} X'''_3$ are within the ranges of $10^{-5} \leq a \leq 0.5$, $0 \leq b \leq 10^{-3}$ and $0 \leq c \leq 10^{-3}$, respectively.

The metal oxide indicated by A in the formula (I) is desired to be at least one metal oxide selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$. From the viewpoint of the enhancement in the luminance of stimulated emission of the phosphor, $Al_2O_3$ and $SiO_2$ are preferred, and particularly preferred is $SiO_2$. The number for x indicating the amount of the metal oxide is preferred within the range of $10^{-5} \leq x \leq 0.1$, from the viewpoint of the enhancement in the luminance of stimulated emission of the phosphor and of the afterglow characteristics thereof.

In the formula (I), the number for y indicating the amount of the divalent europium activator is preferred within the range of $10^{-4} \leq y \leq 3 \times 10^{-2}$, from the viewpoint of the enhancement in the luminance of stimulated emission of the phosphor.

The divalent europium activated complex halide phosphor employed in the present invention can be prepared, for instance, in the following process.

A mixture of starting materials for the phosphor is prepared by using at least an alkaline earth metal halide, a metal oxide source and a trivalent europium compound in specific amounts. Then, the mixture of starting materials for the phosphor is fired. The so fired product is pulverized and classified, if desired. For obtaining the homogeneous mixture of starting materials, it is preferred to prepare the mixture in the form of an aqueous suspension, and in this case the suspension is heated to dryness prior to the above-mentioned firing stage.

Particularly, the divalent europium activated complex halide phosphor employed in the invention is preferred to prepare in the following manner.

After preparing a mixture of starting materials comprising specific amounts of an alkaline earth metal halide, a metal oxide source and a trivalent europium compound, the mixture is fired at least two times and at least a portion of the metal oxide source is added to the fired product obtained after the first firing stage.

It has been found that the phosphor prepared in the above-described manner in which the firing is carried out in two stages shows stimulated emission of prominently high luminance.

Examples of the binder to be employed in the phosphor layer include: natural polymers such as proteins (e.g. gelatin), polysaccharides (e.g. dextran) and gum arabic; and synthetic polymers such as poly(vinyl butyral), poly(vinyl acetate), nitrocellulose, ethylcellulose, vinylidene chloride-vinyl chloride copolymer, poly(methyl methacrylate). vinyl chloride-vinyl acetate copoymer, polyurethane, cellulose acetate butyrate, poly(vinyl alcohol), and linear polyester. Particularly preferred are nitrocellulose, linear polyester, and a mixture of nitrocellulose and linear polyester.

The phosphor layer can be formed on a support, for instance, by the following procedure.

In the first place, the phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; S5 chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder : phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

The support material employed in the present invention can be selected from those employed in the conventional radiographic intensifying screens. Examples of the support material include plastic films such as films of cellulose acetate, polyester, poly(ethylene terephthalate), polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with poly(vinyl alcohol) or the like. From a viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high sharpness type radiation image storage panel, while the latter is appropriate for preparing a high sensitive type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image provided thereby For instance, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided depending on the type of the radiation image storage panel to be obtained.

As described in Japanese Patent Application No. 57(1982)-82431 (which corresponds to U.S. patent application No. 496,278 and the whole content of which is described in European Patent Publication No. 92241), the phosphor layer side surface of the support (or the surface of an adhesive layer, light-reflecting layer, or light-absorbing layer in the case that such layers are provided on the phosphor layer) may be provided with protruded and depressed portions for enhancement of the sharpness of radiographic image, and the constitution of those protruded and depressed portions can be selected depending on the purpose of the radiation image storage panel.

After applying the coating dispersion to the support as described above, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, preferably from 50 to 500 $\mu$m.

The phosphor layer can be provided on the support by methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer placed on the support can be in the form of a single layer or in the form of plural (two or more) layers. When the plural phosphor layers are placed, at least one layer contains the aforementioned divalent europium activated complex halide phosphor having the formula (I), and the plural layers may be placed in such a manner that a layer nearer to the surface shows stimulated emission of higher luminance. In any case, namely, in either the single phosphor layer or plural phosphor layers, a variety of known stimulable phosphors are employable in combination with the above-mentioned stimulable phosphor.

Examples of the stimulable phosphor employable in combination with the above-mentioned stimulable phosphor in the radiation image storage panel of the present invention include the phosphors described hereinbefore and the phosphors described below;

ZnS:Cu,Pb, BaO.xAl$_2$O$_3$:Eu, in which x is a number satisfying the condition of $0.8 \leq x \leq 10$, and M$^{2+}$O. xSiO$_2$:A in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

(Ba$_{1-x-y}$, Mg$_x$, Ca$_y$) FX:aEu$^{2+}$, in which X is at least one element selected from the group consisting of Cl and Br, x and y are numbers satisfying the conditions of $0 \leq x+y \leq 0.6$, and $xy = 0$, and a is a number satisfying the condition of $10^{-6} \leq a \leq 5 \times 10^{-2}$, as described in Japanese Patent Provisional Publication No. 55(1980)-12143; and LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078.

A radiation image storage panel generally has a transparent film on a free surface of a phosphor layer to physically and chemically protect the phosphor layer. In the panel of the present invention, it is preferable to provide a transparent film for the same purpose.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. poly(methyl methacrylate), poly(vinyl butyral), poly(vinyl formal), polycarbonate, poly(vinyl acetate), or vinyl chloride vinyl acetate copolymer), and drying the coated solution. Alternatively, the transparent film can be provided on the phosphor layer by beforehand preparing it from a polymer such as poly(ethylene terephthalate), polyethylene, poly(vinylidene chloride) or polyamide, followed by placing and fixing it onto the phosphor layer with an appropriate adhesive agent. The transparent protective film preferably has a thickness within the range of approximately 3 to 20 $\mu$m.

The present invention will be illustrated by the following examples, but these examples by no means restrict the invention.

EXAMPLE 1

175.4 g. of barium fluoride (BaF$_2$) and 333.3 g. of barium bromide (BaBr$_2$.2H$_2$O) were mixed well using an alumina mortar for 30 min. and heated to 150° C. for 2 hours to produce barium fluorobromide (BaFBr). To the barium fluorobromide was added a hydrobromic acid solution (HBr; 47 weight %) containing 0.352 g. of europium oxide (Eu$_2$O$_3$), and the resultant was mixed well to give a suspension. The suspension was dried at 130° C. under reduced pressure for 2 hours. The dried product was pulverized using an automortar made of highly pure alumina for 1 hour to obtain a mixture of barium fluorobromide and europium bromide (EuBr$_3$). To the mixture was added 0.617 g. of sodium bromide and the resultant was mixed to prepare a mixture of starting materials for a phosphor.

100 g. of the mixture of starting materials was then placed in a quartz boat, which was, in turn, placed in a tubular furnace for carrying out the first firing. The first firing was conducted at 900° C. for 2 hours in a stream of nitrogen gas containing 3 weight % of hydrogen gas flowing at the rate of 300 ml/min. After the firing was complete, thus fired product was taken out of the furnace and allowed to stand for cooling.

Subsequently, the product obtained in the above first firing stage was pulverized for 20 hours by means of an alumina ball mill. To the pulverized fired product was then added 0.1 g. of silicon dioxide (0.0039 mol. per 1 mol. of barium fluorobromide; the same expression shall be employed in the examples hereinafter), and the resultant was mixed using a V-type blender. The mixture was again placed in a quartz boat and fired in a tubular furnace for carrying out the second firing. The second firing was conducted at 600° C. for 2 hours in the same stream as employed in the first firing stage. After the second firing stage was complete, the fired product was taken out of the furnace and allowed to stand for cooling to obtain a powdery divalent europium activated complex halide phosphor containing $SiO_2$ (BaFBr.0.003NaBr.0.0039$SiO_2$:0.001$Eu^{2+}$).

EXAMPLE 2

The procedure of Example 1 was repeated except that a mixture of starting materials for a phosphor was prepared by adding 0.473 g. of silicon dioxide (0.039 mol.) as well as 0.617 g. of sodium bromide to the mixture of barium fluorobromide and europium bromide, to obtain a powdery divalent europium activated complex halide phosphor containing $SiO_2$ (BaFBr.0.003NaBr.0.0078$SiO_2$:0.001$Eu^{2+}$).

EXAMPLE 3

The procedure of Example 3 was repeated except that 0.473 g. of silicon dioxide (0.0039 mol.) as well as 0.617 g. of sodium bromide was added to the mixture of barium fluorobromide and europium bromide to prepare a mixture of starting materials for a phosphor, and that the addition of silicon dioxide to the product of the first firing stage was omitted, to obtain a powdery divalent europium activated complex halide phosphor containing $SiO_2$ (BaFBr.0.003NaBr.0.0039$SiO_2$:0.001$Eu^{2+}$).

COMPARISON EXAMPLE 1

The procedure of Example 1 was repeated except that the addition of silicon dioxide to the produce of the first firing stage was omitted, to obtain a powdery divalent europium activated complex halide phosphor (BaFBr.0.003NaBr:0.001$Eu^{2+}$).

The phosphors prepared in Examples 1 through 3 and Comparison Example 1 were measured on the luminance of stimulated emission when excited with a He-Ne laser (oscillation wavelength: 632.8 nm) after exposure to X-rays at the voltage of 80 KVp, to evaluate the luminance of stimulated emission thereof.

The results on the evaluation of the phosphors are set forth in Table 1. The amount of $SiO_2$ introduced into the phosphor is expressed in a molar ratio to 1 mol. of barium fluorobromide (BaFBr).

TABLE 1

| | | Amount of $SiO_2$ | | Relative Luminance |
|---|---|---|---|---|
| | | Before FF | After FF | |
| Example | 1 | 0 | 0.0039 | 140 |

TABLE 1-continued

| | | Amount of $SiO_2$ | | Relative Luminance |
|---|---|---|---|---|
| | | Before FF | After FF | |
| | 2 | 0.0039 | 0.0039 | 130 |
| | 3 | 0.0039 | 0 | 120 |
| Com. Ex. | 1 | 0 | 0 | 100 |

Remark:
"Before FF" means "$SiO_2$ added in the stage of preparation of the mixture before the first firing stage", and "After FF" means "$SiO_2$ added after the first firing stage"; the same expression shall be used hereinafter.

EXAMPLE 4

The procedure of Example 1 was repeated except for adding 0.1 g. of aluminum oxide ($Al_2O_3$;0.0023 mol.) instead of 0.1 g. of silicon dioxide (0.0039 mol.) to the product of the first firing stage, to obtain a powdery divalent europium activated complex halide phosphor containing $Al_2O_3$ (BaFBr.0.003NaBr.0.0023$Al_2O_3$:0.001$Eu^{2+}$).

EXAMPLE 5

The procedure of Example 1 was repeated except for adding 0.1 g. of magnesium oxide (MgO; 0.0059 mol.) instead of 0.1 g. of silicon dioxide (0.0039 mol.) to the product of the first firing stage, to obtain a powdery divalent europium activated complex halide phosphor containing MgO (BaFBr.0.003NaBr.0.0059MgO:0.001$Eu^{2+}$).

EXAMPLE 6

The procedure of Example 1 was repeated except for adding 0.1 g. of calcium oxide (CaO; 0.0042 mol.) instead of 0.1 g. of silicon dioxide (0.0039 mol.) to the product of the first firing stage, to obtain a powdery divalent europium activated complex halide phosphor containing CaO (BaFBr.0.003NaBr.0.0042CaO:0.001$Eu^{2+}$).

The phosphors prepared in Examples 4 through 6 were measured on the luminance of stimulated emission when excited with a He-Ne laser (oscillation wavelength: 632.8 nm) after exposure to X-rays at the voltage of 80 KVp, to evaluate the luminance of stimulated emission thereof.

The results on the evaluation of the phosphors are set forth in Table 2. The aforementioned result on the evaluation of the phosphor prepared in Comparison Example 1 is also set forth in Table 2. The amount of the metal oxide introduced into the phosphor is expressed in a molar ratio to 1 mol. of BaFBr.

TABLE 2

| | | Metal Oxide | Amount Added To Fired Product | Relative Luminance |
|---|---|---|---|---|
| Example | 4 | $Al_2O_3$ | 0.0023 | 135 |
| | 5 | MgO | 0.0059 | 120 |
| | 6 | CaO | 0.0042 | 120 |
| Com. Ex. | 1 | None | 0 | 100 |

EXAMPLE 7

The procedure of Example 1 was repeated except that a mixture of starting materials for a phosphor was prepared by adding 1.01 g. of beryllium bromide instead of 0.617 g. of sodium bromide to the mixture of barium fluorobromide and europium bromide, to obtain a powdery divalent europium activated complex halide phosphor containing $SiO_2$ (BaFBr.0.003$BeBr_2$.0.0039$SiO_2$:0.001$Eu^{2+}$).

EXAMPLE 8

The procedure of Example 1 was repeated except that a mixture of starting materials for a phosphor was prepared by adding 1.60 g. of aluminium bromide instead of 0.617 g. of sodium bromide to the mixture of barium fluorobromide and europium bromide, to obtain a powdery divalent europium activated complex halide phosphor containing $SiO_2$ ($BaFBr \cdot 0.003AlBr_3 \cdot 0.0039SiO_2 : 0.001Eu^{2+}$).

The phosphors prepared in Examples 7 and 8 were measured on the luminance of stimulated emission when excited with a He-Ne laser (oscillation wavelength: 632.8 nm) after exposure to X-rays at the voltage of 80 KVp, to evaluate the luminance of stimulated emission thereof.

The results on the evaluation of the phosphors are set forth in Table 3. The aforementioned result on the evaluation of the phosphor prepared in Example 1 is also set forth in Table 3. The amount of the metal halide is expressed in a molar ratio to 1 mol. of BaFBr.

TABLE 3

| | | Metal Halide | Amount Added | Relative Luminance |
|---|---|---|---|---|
| Example | 7 | BeBr | 0.003 | 120 |
| | 8 | $AlBr_3{}^2$ | 0.003 | 120 |
| | 1 | NaBr | 0.003 | 140 |

EXAMPLE 9

To a mixture of the powdery divalent europium activated complex halide phosphor containing $SiO_2$ ($BaFBr \cdot 0.003NaBr \cdot 0.0039SiO_2 : 0.001Eu^{2+}$) obtained in Example 1 and a linear polyester resin were added successively methyl ethyl ketone and nitrocellulose (nitrification degree: 11.5%), to prepare a dispersion containing the phosphor and the binder (10:1, by weight). Subsequently, tricresyl phosphate, n-butanol and methyl ethyl ketone were added to the dispersion. The mixture was sufficiently stirred by means of a propeller agitater to obtain a homogeneous coating dispersion having a viscosity of 25-35 PS (at 25° C.).

The coating dispersion was applied to a polyethylene terephthalate sheet containing carbon black (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having thickness of 300 μm was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Thus, a radiation image storage panel consisting essentially of a support, a phosphor layer and a transparent protective film was prepared.

COMPARISON EXAMPLE 2

The procedure of Example 9 was repeated except for using a powdery divalent europium activated barium fluorohalide phosphor ($BaFBr:0.001Eu^{2+}$) as a stimulable phosphor instead of the powdery divalent europium activated complex halide phosphor containing $SiO_2$, to prepare a radiation image storage panel consisting essentially of a support, a phosphor layer and a transparent protective film.

The radiation image storage panels prepared in Example 9 and Comparison Example 2 were measured on the sensitivity when excited with a He-Ne laser (oscillation wavelength: 632.8 nm) after exposure to X-rays at the voltage of 80 KVp, to evaluate the sensitivity thereof.

The results on the evaluation of the panels are set forth in Table 4.

TABLE 4

| | | Relative Sensitivity |
|---|---|---|
| Example | 9 | 100 |
| Com. Example | 1 | 70 |

We claim:

1. A radiation image recording and reproducing method comprising steps of
causing a stimulable phosphor to absorb a radiation having passed through an object or radiated by an object,
exposing said stimulable phosphor to an electromagnetic wave having a wavelength within the range of 450-800 nm to release the radiation energy stored therein as light emission, and
detecting the emitted light,
in which said stimulable phosphor is a divalent europium activated complex halide phosphor having the formula (I):

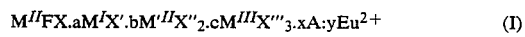

$$M^{II}FX \cdot aM^{I}X' \cdot bM'^{II}X''_2 \cdot cM^{III}X'''_3 \cdot xA : yEu^{2+} \quad (I)$$

in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X" and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$, and $a+b+c \geq 10^{-6}$; and x and y are numbers satisfying the conditions of $0 < x \leq 0.5$ and $0 < y \leq 0.2$, respectively.

2. The radiation image recording and reproducing method as claimed in claim 1, in which each of X', X" and X''' in the formula (I) is Br.

3. The radiation image recording and reproducing method as claimed in claim 1 or 2, in which $M^{I}$ in the formula (I) is Na.

4. The radiation image recording and reproducing method as claimed in claims 1 or 2, in which a, b and c in the formula (I) are numbers satisfying the conditions of $10^{-5} \leq a \leq 0.5$, $0 \leq b \leq 10^{-3}$, and $0 \leq c \leq 10^3$, respectively.

5. The radiation image recording and reproducing method as claimed in claims 1 or 2, in which A in the formula (I) is at least one metal oxide selected from the group consisting of $Al_2O_3$ and $SiO_2$.

6. The radiation image recording and reproducing method as claimed in claims 1 or 2, in which x in the formula (I) is a number satisfying the condition of $10^{-5} \leq x \leq 0.1$.

7. A radiation image storage panel comprising a support and at least one phosphor layer provided thereon which comprises a binder and a stimulable phosphor dispersed therein, in which at least one phosphor layer contains a divalent europium activated complex halide phosphor having the formula (I):

$$M^{II}FX \cdot aM^{I}X' \cdot bM'^{II}X''_2 \cdot cM^{III}X'''_3 \cdot xA:yEu^{2+} \quad (I)$$

in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X" and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$, and $a+b+c \geq 10^{-6}$; and x and y are numbers satisfying the conditions of $0 < x > 0.5$ and $0 < y \leq 0.2$, respectively.

8. The radiation image storage panel as claimed in claim 7, in which each of X', X" and X''' in the formula (I) is Br.

9. The radiation image storage panel as claimed in claim 7 or 8, in which $M^{I}$ in the formula (I) is Na.

10. The radiation image storage panel as claimed in claim 7 or 8, in which a, b and c in the formula (I) are numbers satisfying the conditions of $10^{-5} \leq a \leq 0.5$, $0 \leq lb \leq 10^{-3}$, and $0 \leq c \leq 10^{-3}$, respectively.

11. The radiation image storage panel as claimed in claim 7 or 8, in which A in the formula (I) is at least one metal oxide selected from the group consisting of $Al_2O_3$ and $SiO_2$.

12. The radiation image storage panel as claimed in claim 7 or 8, in which x in the formula (I) is a number satisfying the condition of $10^{-5} \leq x \leq 0.1$.

* * * * *